United States Patent [19]

Erhardt et al.

[11] Patent Number: 4,976,044
[45] Date of Patent: Dec. 11, 1990

[54] SCANNER HEAD FOR A TOOTH-FLANK SCANNING DEVICE

[75] Inventors: Manfred Erhardt, Puchheim; Herbert Loos, Dorfen-Stadt, both of Fed. Rep. of Germany

[73] Assignee: Carl Hurth Maschinen- und Zahnradfabrik GmbH & Co., Munich, Fed. Rep. of Germany

[21] Appl. No.: 155,355

[22] Filed: Feb. 12, 1988

[30] Foreign Application Priority Data

Feb. 20, 1987 [DE] Fed. Rep. of Germany ....... 3705537

[51] Int. Cl.$^5$ .............................................. G01B 5/16
[52] U.S. Cl. .................................. 33/501.14; 33/501.9; 33/558; 73/162
[58] Field of Search .................... 33/179.5 R, 179.5 A, 33/179.5 D, 179.5 E, 556, 557, 558, 559, 560, 561; 73/162

[56] References Cited

U.S. PATENT DOCUMENTS

| | | | |
|---|---|---|---|
| 1,911,442 | 5/1933 | Earl | 33/179.5 A |
| 2,831,260 | 4/1958 | Shaw | 33/559 |
| 3,936,946 | 2/1976 | Ruffner et al. | 33/179.5 R |
| 4,166,323 | 9/1979 | Maag | 33/179.5 R |
| 4,601,111 | 7/1986 | Berchtold | 33/559 |

FOREIGN PATENT DOCUMENTS

| | | |
|---|---|---|
| 543959 | 11/1925 | Fed. Rep. of Germany . |
| 1448434 | 10/1968 | Fed. Rep. of Germany . |
| 3212082 | 10/1983 | Fed. Rep. of Germany . |
| 3705537 | 11/1988 | Fed. Rep. of Germany . |
| 363810 | 9/1962 | Switzerland ................... 33/179.5 A |
| 640647 | 7/1950 | United Kingdom ........... 33/179.5 R |

OTHER PUBLICATIONS

30 Jahre Registrierende Zeiss–Jena–Evolventenprufgerate fur Prazisionsmessungen, 1969, pp. 290–295.

Primary Examiner—William A. Cuchlinski, Jr.
Assistant Examiner—Patrick R. Scanlon
Attorney, Agent, or Firm—Flynn, Thiel, Boutell & Tanis

[57] ABSTRACT

A scanner head for a tooth-flank scanning device for testing and measuring of gears and similar parts, in particular of gearlike tools having abrasive tooth flanks, is adapted to be introduced into a tooth space of the respective gear or similar part and which can be guided along one of the tooth flanks bordering the tooth space. The scanning piece or insert is formed by the convex surface of a spherical segment, the radius of which is substantially greater than the radius of a ball introducible into the tooth space.

6 Claims, 2 Drawing Sheets

U.S. Patent   Dec. 11, 1990   Sheet 2 of 2   4,976,044
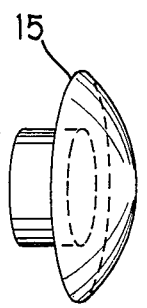
FIG. 5
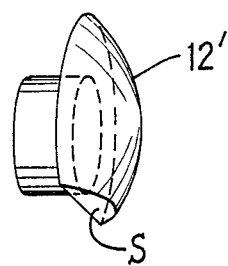
FIG. 6
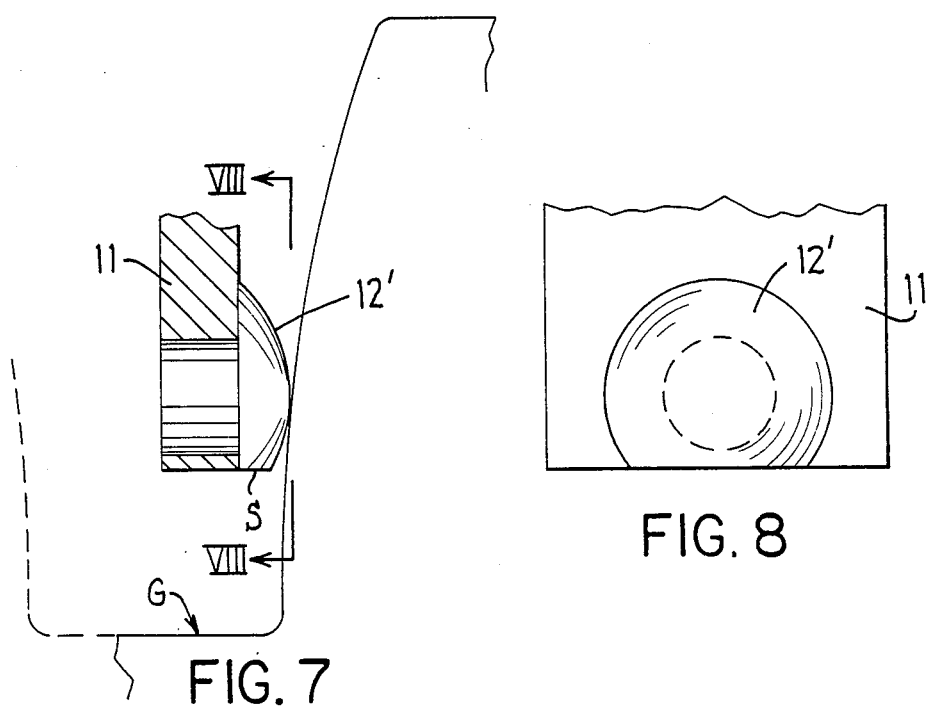
FIG. 7
FIG. 8

SCANNER HEAD FOR A TOOTH-FLANK SCANNING DEVICE

FIELD OF THE INVENTION

The invention relates to a scanner head for scanning a tooth flank of a gear for the purpose of facilitating the surface characteristics of the tooth flank to be measured.

BACKGROUND OF THE INVENTION

On tooth-flank scanning devices for testing and measuring the flanks of gears and similar parts, the respective flank is scanned by a scanner, which for this purpose is moved relative to the tooth flank. This movement occurs usually in the longitudinal direction of the tooth for testing the flank direction or in elevational direction of the tooth for testing the involute shape. The part of the scanner directly contacting the tooth flank, the scanner head, has in conventional devices, the shape of a truncated cone (German OS No. 32 12 082) or of a ball (German AS No. 23 64 917 and U.S. Pat. No. 3,936,940).

For testing and measuring of gears and gearlike gear-cutting tools, as for example gear-shaped cutters and bed drive pinions, such scanner heads have been successful for a long time. In gearlike tools with abrasive flank surfaces, as for example honing gears, grinding worms and the like, they deliver only unsatisfactory results. The truncated-cone-shaped scanner heads rest with the edge formed by the largest diameter of the truncated cone on the tooth flank. The edge representing an angle of about 60° registers during the relative movement between tooth flank and scanner every irregularity, which in the case of abrasive surfaces are naturally very many. A so created recording chart does not make possible an unambiguous statement for example regarding the actual flank direction. A slightly stronger statement is provided by a recording chart on which is recorded data using a spherical scanner head. The size of the balls which can be used, however, have limits in particular in the case of small-modular tooth systems. Thus, in the case of a toothed tool for m. =2, only a ball having an approximately 1 to 1.5 mm. diameter can be introduced into a tooth space to near the dedendum circle without resting on both flanks. The smaller the ball, the more it registers roughness caused by the surface with the above-mentioned disadvantage, and the more it is exposed to wear by the abrasive surface. This wear occurs also with the truncated-cone-shaped scanner head.

Starting out from these deficiencies, the basic purpose of the invention is to provide a scanner head which is suited for testing and measuring the flanks of gears and similar parts, in particular of gearlike tools with abrasive flank surfaces. The scanner head is thereby also supposed to be usable for small-modular gears or tools.

To attain the purpose, a scanner head is provided which has a section which can be introduced or guided into a tooth space of the respective gear or similar part and which can be guided along one of the tooth flanks bordering the tooth space, the section being formed by the convex surface of a spherical segment, the radius of which is substantially larger than the radius of a ball introducible into the tooth space. Such a scanner head can be very small, since only a narrow cup and a thin support element need be introduced into the tooth space of the respective gear or tool. The large cup or ball radius does not register every unevenness on the tooth flank, but delivers a usable medium value. Furthermore, it is less susceptible to wear, since the contact pressure does not only act onto one projecting abrasive grain or the like, but is distributed onto several. The adjusting of the scanner head is made easier when the spherical segment is arranged on a holder mounted on the tooth-flank scanning device, which holder is pivotal about an axis which extends through the centerpoint of the ball, from which the spherical segment was formed, and perpendicularly to the direction of movement of the scanner head relative to the tooth flank to be scanned.

BRIEF DESCRIPTION OF THE DRAWINGS

The invention will be described hereinafter with reference to one exemplary embodiment which is illustrated in four figures, in which

FIG. 5 is a perspective view of the spherical segment and stem without the associated supporting structure;

FIG. 6 is a perspective view of a modified form of the spherical segment and stem, wherein a flat edge is provided thereon;

FIG. 7 is an enlarged illustration of the modified spherical segment in engagement with a flank surface of a tooth; and FIG. 8 is a view of the modified spherical segment taken along the line VIII—VIII of FIG. 7.

DETAILED DESCRIPTION

Figure 1:
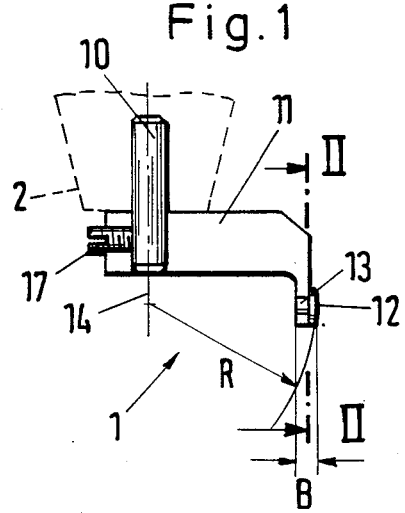
FIG. 1 is a front view of a scanner head according to the invention.
Figure 2:
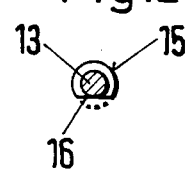
FIG. 2 is a cross-sectional view taken along the line II—II of FIG. 1.

FIG. 1 illustrates a scanner head 1 for insertion into a known tooth-flank scanning device 2. The latter is only schematically indicated since its design is of no importance for the invention. A pin 10 projecting from a leg at one end of a L-shaped holder 11 is inserted into a receiving opening in the scanning device 2 to facilitate a securement of the scanner head 1 to the scanning device 2. The holder has a spherical-segment-shaped piece or insert 12 at the other end of the holder 11. The insert 12 has, in the illustrated example, a cylindrical stem 13 which is received in an opening in the holder 11, however, it can also be secured in a different manner. The radius (R) of the spherical segment 12 starts out from the axis 14 of the pin 10. The spherical segment 12 can have a circular contour 15. It can, however, as shown by the broken line 16 in FIG. 2 or the illustrations of FIGS. 6 to 8, also have at least on one side a straight edge or surface S on a modified spherical segment 12' in order to be able to be moved as far as possible into a tooth space of the workpiece to be tested or to be measured, namely as far as possible toward the base of the tooth or tooth gullet or bottom land G as shown in FIG. 7. The thickness (B) of the second leg with the insert 12 can, in an extreme case, be less than 2 mm., so that the scanner head is suited also for very narrow tooth spaces.

Figure 3:
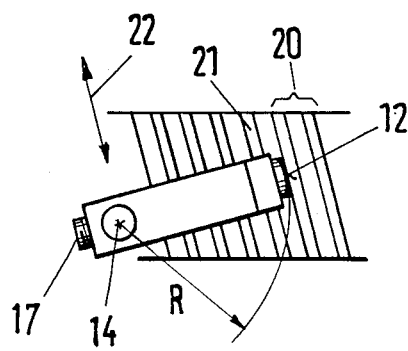
FIG. 3 is a schematic illustration of the arrangement of the scanner head during a testing of the flank direction on a helically toothed workpiece.

FIG. 3 illustrates the scanner head 1 in a simplified manner in cooperation with a tooth flank 21 of the workpiece tooth 20, the direction of the relative movement between scanner head 1 and tooth 20 being identified by the reference numeral 22. In order to simplify adjusting and/or setting up of the spherical segment 12 relative to the tooth flank 21, the scanner head 1 is pivotal about the axis 14. A clamping screw 17 is provided for fixing the scanner head 1 to the pin 10.

Figure 4:
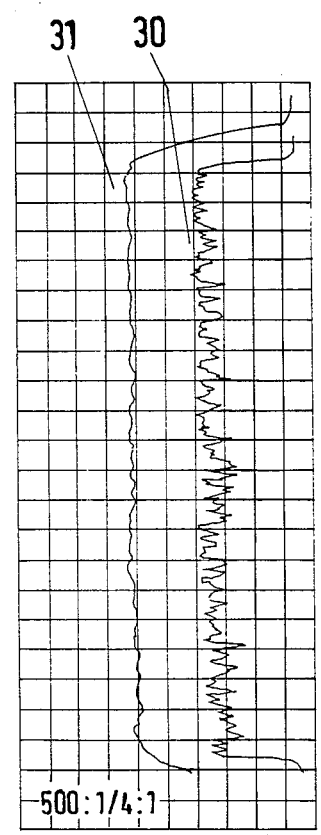
FIG. 4 illustrates two recordings on a chart in comparison, one of which is recorded with a conventional scanner head and the other recorded with an inventive scanner head.

FIG. 4 illustrates for comparison purposes, one recording chart and two recordings, one recording 30 which used a conventional truncated-cone-shaped scanner on a tooth flank of a gear precision-working tool coated with CBN, and one recording 31 which used an inventive scanner head at the same place on the same tool. The spherical segment 12 being utilized had a radius of R=60 mm. It can clearly be recognized that the flank direction can easily be visually determined from the chart 31, whereas it cannot be easily visually determined in the multiple jagged recording 30.

The embodiments of the invention in which an exclusive property or privilege is claimed are defined as follows:

1. In a scanner head for a tooth-flank scanning device for testing and measuring of gearlike tools which have abrasive tooth flanks, said scanner head having tooth engaging means thereon adapted to be introduced into a tooth space of the respective gear and which is further adapted to be guided along one of the tooth flanks bordering the tooth space, the improvement wherein said tooth engaging means is defined by a spherical segment having means defining a tooth flank engaging spherical surface, the radius of which tooth engaging spherical surface being substantially larger than the radius of a ball introducible into the tooth space, said tooth engaging means including a holder adapted to be secured to the tooth-flank scanning device, said holder being pivotal about an axis extending through a centerpoint of said spherical surface on said spherical segment and perpendicularly to the direction of movement of said scanner head relative to the tooth flank to be scanned.

2. The scanner head according to claim 1, wherein said radius of said spherical surface on said spherical segment is at least 5 mm.

3. The scanner head according to claim 1, wherein a flattened edge means is provided on a portion of said spherical segment facing a base of a tooth gullet of the respective gear or similar part.

4. The scanner head according to claim 1, wherein said tooth engaging means further includes a cylindrical stem attached to said spherical segment on a flat side thereof remote from said spherical surface, said cylindrical stem extending perpendicularly away from said flat side.

5. The scanner head according to claim 4, wherein an edge of said spherical segment is circular when viewed along an axis of said cylindrical stem, said axis forming the center for said circular edge.

6. The scanner head according to claim 4, wherein a majority of an edge of said spherical segment is circular when viewed along an axis of said cylindrical stem, a remainder portion of said edge extending on a chord to said circular edge.

* * * * *